United States Patent
Wang et al.

(10) Patent No.: US 9,575,328 B2
(45) Date of Patent: Feb. 21, 2017

(54) STEREOSCOPIC DISPLAY DEVICE AND CELL-ALIGNING PACKAGING METHOD OF THE SAME

(71) Applicant: BOE TECHNOLOGY GROUP CO., LTD., Beijing (CN)

(72) Inventors: Qiangtao Wang, Beijing (CN); Hyunsic Choi, Beijing (CN); Haiyan Wang, Beijing (CN); Zheng Fang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 67 days.

(21) Appl. No.: 14/420,746

(22) PCT Filed: Apr. 21, 2014

(86) PCT No.: PCT/CN2014/075810
§ 371 (c)(1),
(2) Date: Feb. 10, 2015

(87) PCT Pub. No.: WO2015/089966
PCT Pub. Date: Jun. 25, 2015

(65) Prior Publication Data
US 2016/0033781 A1 Feb. 4, 2016

(30) Foreign Application Priority Data
Dec. 19, 2013 (CN) .......................... 2013 1 0706782

(51) Int. Cl.
*G02F 1/15* (2006.01)
*G02F 1/1333* (2006.01)
(Continued)

(52) U.S. Cl.
CPC ........... *G02B 27/26* (2013.01); *G02B 27/2214* (2013.01); *G02F 1/133528* (2013.01);
(Continued)

(58) Field of Classification Search
CPC ................................................. G02B 27/2214
See application file for complete search history.

(56) References Cited

U.S. PATENT DOCUMENTS

2007/0019119 A1* 1/2007 Tanaka .................. G02F 1/1347
349/15
2010/0225835 A1 9/2010 Lin
(Continued)

FOREIGN PATENT DOCUMENTS

CN 201037882 Y 3/2008
CN 101162319 A 4/2008
(Continued)

OTHER PUBLICATIONS

Chinese Office Action dated May 6, 2015 issued in corresponding Chinese Application No. 201310706782.6.
(Continued)

*Primary Examiner* — Wen-Ying P Chen
(74) *Attorney, Agent, or Firm* — Nath, Goldberg & Meyer; Joshua B. Goldberg

(57) ABSTRACT

The present invention relates to the field of display technology, and particularly to a stereoscopic display device and a cell-aligning packaging method of the same. The stereoscopic display device is divided into a display area and a non-display area surrounding the display area on the periphery of the display area, and comprises a conversion panel and a liquid crystal panel which are aligned to form a cell, a first polarizer is provided between the conversion panel and the liquid crystal panel, the first polarizer is arranged in the display area, and an adhesive lump is provided around the first polarizer and correspondingly to the non-display area between the conversion panel and the liquid crystal panel and is used for bonding the conversion panel and the liquid crystal panel into a whole.

11 Claims, 3 Drawing Sheets

(51) Int. Cl.
*G02F 1/13* (2006.01)
*G02F 1/1347* (2006.01)
*G02B 27/26* (2006.01)
*G02B 27/22* (2006.01)
*G02F 1/1335* (2006.01)
*G02F 1/29* (2006.01)

(52) U.S. Cl.
CPC ...... *G02F 1/1347* (2013.01); *G02F 2001/294* (2013.01); *G02F 2202/28* (2013.01)

(56) References Cited

U.S. PATENT DOCUMENTS

| | | | |
|---|---|---|---|
| 2011/0013115 A1* | 1/2011 | Kajita | G02F 1/133528 349/61 |
| 2012/0094568 A1* | 4/2012 | Miyazaki | B32B 37/1018 445/3 |
| 2012/0182488 A1* | 7/2012 | Kuwajima | G02F 1/1347 349/15 |
| 2012/0314383 A1* | 12/2012 | Oohira | G02F 1/13452 361/749 |
| 2013/0208195 A1* | 8/2013 | Cho | G02F 1/134309 349/15 |

FOREIGN PATENT DOCUMENTS

| | | |
|---|---|---|
| CN | 101387757 A | 3/2009 |
| CN | 101604091 A | 12/2009 |
| CN | 201489131 U | 5/2010 |
| CN | 102385195 A | 3/2012 |
| CN | 202275244 U | 6/2012 |
| CN | 203037967 U | 7/2013 |
| CN | 103293730 A | 9/2013 |
| CN | 103698892 A | 4/2014 |
| JP | 2005181410 A | 7/2005 |

OTHER PUBLICATIONS

Written Opinion of the International Searching Authority dated Oct. 9, 2014 issued in International Application No. PCT/CN2014/075810.

Search Report issued in International Application No. PCT/CN2014/075810 dated Dec. 19, 2013 (Dec. 19, 2013).

* cited by examiner

STEREOSCOPIC DISPLAY DEVICE AND CELL-ALIGNING PACKAGING METHOD OF THE SAME

This is a National Phase Application filed under 35 U.S.C. 371 as a national stage of PCT/CN2014/075810, filed Apr. 21, 2014, an application claiming the benefit to Chinese Application No. 201310706782.6, filed Dec. 19, 2013; the content of each of which is hereby incorporated by reference in its entirety.

FIELD OF THE INVENTION

The present invention relates to the field of display technology, and particularly to a stereoscopic display device and a cell-aligning packaging method of the same.

BACKGROUND OF THE INVENTION

As thin film transistor liquid crystal display (simply referred to as TFT-LCD) technology develops and industrial technology advances, production cost of a liquid crystal display device has been falling gradually, and manufacturing process thereof has been improving. At present, the liquid crystal display technology has become a mainstream technology in the field of flat panel display technology, and meanwhile, due to its own advantages, the liquid crystal display device has become an ideal display device both at the market and in viewers' hearts.

With the gradual increase of living standards, consumers place greater demands on display devices, and three-dimension (3D) stereoscopic display is gradually coming into view. Compared to common display technology, 3D stereoscopic display technology can enable a display image not to be confined to the plane of a screen, but to become stereoscopic and lifelike, so that viewers feel as if they were personally on the scene and experience stronger visual impact. Therefore, 3D stereoscopic display devices of high display quality become an ideal option for users. Among them, autostereoscopic display gains a large amount of popularity due to its exclusive advantage that viewers can experience a stereoscopic effect without wearing 3D glasses. Techniques for realizing autostereoscopic display include many methods such as parallax barrier, lenticular, directional backlight, liquid crystal lens and the like.

The liquid crystal lens method is a technique in which two substrates arranged oppositely and with twisted nematic liquid crystals filled therebetween are used to form a 3D conversion panel. As shown in FIG. 1, rectangles filled by different patterns in FIG. 1 represent electrodes 7 applied with different voltages, the electrodes 7 form a gradient electric filed in a conversion panel 1, and the twisted nematic liquid crystals rotate under the action of the gradient electric field. Since twisted nematic liquid crystals at different positions are subjected to different electric field forces, rotation directions thereof are different, which makes a refractive index distribution of liquid crystal molecules present an effect of multiple lenses (that is, equivalent to lenses of liquid crystal lens). In this way, an image of current viewpoint is projected to a corresponding field of view, and 3D stereoscopic display is thus realized. The liquid crystal lens method not only has the advantages of capability of performing 2D/3D conversion and high transmittance, but can also easily achieve adjustment to the best viewing distance due to adjustable focal length of the liquid crystal lens, so as to achieve an effect of tracking stereoscopic display with naked eyes, thus becoming the most promising stereoscopic display technique.

Currently, the liquid crystal lens method has been applied to display devices which need relatively large visual distance, such as televisions and the like. However, with the development of portable mobile product technology, portable mobile products (such as mobile phones, PADs, palm-top computers) have been increasingly involved in people's life. Compared to televisions, portable mobile products only need relatively small visual distance, and thus it has become a new development direction for current stereoscopic display devices to develop stereoscopic display panels with small visual distance and applicable to portable mobile products, so as to bring 3D stereoscopic enjoyment to consumers using the portable mobile products.

SUMMARY OF THE INVENTION

The technical problem to be solved by the present invention is to provide a stereoscopic display device and a cell-aligning packaging method of the same, in view of the above disadvantages existing in the prior art. The liquid crystal lens of the stereoscopic display device has a smaller focal length f, which allows the display panel to have a smaller visual distance h which is applicable to portable mobile products.

A technical solution used to solve the technical problem of the present invention is a stereoscopic display device which is divided into a display area and a non-display area surrounding the display area on the periphery of the display area, and comprises a conversion panel and a liquid crystal panel which are aligned to form a cell, and a first polarizer is provided between the conversion panel and the liquid crystal panel, wherein, the first polarizer is arranged in the display area, and an adhesive lump is provided around the first polarizer and correspondingly to the non-display area between the conversion panel and the liquid crystal panel and is used for bonding the conversion panel and the liquid crystal panel into a whole.

Preferably, the first polarizer comprises a first polarizing layer and two supporting layers arranged on two side faces of the first polarizing layer, respectively, a height of the adhesive lump is larger than or equal to a thickness of the first polarizer, and a width of the adhesive lump is smaller than or equal to that of the non-display area.

Preferably, the adhesive lump is formed from powder particles containing $V_2O_5$ material, and the powder particles are capable of absorbing laser energy to melt, and then being cooled and condensed into glass frit, or the adhesive lump is a sealant.

Preferably, the conversion panel comprises two substrates arranged oppositely and a twisted nematic liquid crystal layer arranged between the two substrates, the liquid crystal panel comprises two substrates arranged oppositely and a liquid crystal layer arranged between the two substrates; a thickness of the substrate of the conversion panel close to the first polarizer is smaller than that of the substrate of the conversion panel away from the first polarizer, and/or, a thickness of the substrate of the liquid crystal panel close to the first polarizer is smaller than that of the substrate of the liquid crystal panel away from the first polarizer.

Preferably, the liquid crystal panel also comprises a second polarizer provided at a side of the liquid crystal panel away from the conversion panel, a polarization direction of the first polarizer is perpendicular to that of the second polarizer, the second polarizer is arranged correspondingly to the first polarizer in position, and the second polarizer further extends to the non-display area. Further preferably, an OCA optical adhesive is further provided between the conversion panel and the first polarizer, and/or, between the liquid crystal panel and the first polarizer, and the OCA optical adhesive can further enhance the bonding effect between the first polarizer and the conversion panel and/or the liquid crystal panel.

Preferably, the conversion panel, the liquid crystal panel and the adhesive lump form a sealed space, and pressure in the sealed space is smaller than one standard atmospheric pressure.

Another technical solution used to solve the technical problem of the present invention is a cell-aligning packaging method of a stereoscopic display device, wherein, the stereoscopic display device is divided into a display area and a non-display area surrounding the display area on the periphery of the display area, and comprises a conversion panel and a liquid crystal panel which are aligned to form a cell, a first polarizer is provided between the conversion panel and the liquid crystal panel, and the cell-aligning packaging method comprises: arranging the first polarizer in the display area, and providing an adhesive lump around the first polarizer and correspondingly to the non-display area between the conversion panel and the liquid crystal panel, so that the conversion panel and the liquid crystal panel are bonded into a whole through the adhesive lump.

Preferably, the first polarizer comprises a first polarizing layer and two supporting layers arranged on two side faces of the first polarizing layer respectively, a height of the adhesive lump is larger than or equal to a thickness of the first polarizer, and a width of the adhesive lump is smaller than or equal to that of the non-display area.

As one preferable solution, the cell-aligning packaging method specifically comprises the following steps of: washing the conversion panel or the liquid crystal panel; pretreating the conversion panel or the liquid crystal panel by using UV particles; placing the first polarizer in an area, corresponding to the display area, on one side face of one of the conversion panel and the liquid crystal panel; providing the adhesive lump in an area, corresponding to the non-display area, on the same side face as the one on which the first polarizer is placed or on a side face of the other of the conversion panel and the liquid crystal panel, wherein the adhesive lump is formed from powder particles containing $V_2O_5$ material; pre-sintering the conversion panel or the liquid crystal panel; and melting the adhesive lump by using laser, and bonding the conversion panel and the liquid crystal panel through the adhesive lump, wherein, the adhesive lump surrounds the first polarizer after the conversion panel and the liquid crystal panel are bonded.

As another preferable solution, the cell-aligning packaging method specifically comprises the following steps of: washing the conversion panel or the liquid crystal panel; pretreating the conversion panel or the liquid crystal panel by using UV particles; placing the first polarizer in an area, corresponding to the display area, on one side face of one of the conversion panel and the liquid crystal panel; providing a sealant in an area, corresponding to the non-display area, on the same side face as the one on which the first polarizer is placed or on a side face of the other of the conversion panel and the liquid crystal panel, and bonding the conversion panel and the liquid crystal panel through the sealant, wherein, the sealant surrounds the first polarizer after the conversion panel and the liquid crystal panel are bonded.

Preferably, the conversion panel comprises two substrates arranged oppositely and a twisted nematic liquid crystal layer arranged between the two substrates, the liquid crystal panel comprises two substrates arranged oppositely and a liquid crystal layer arranged between the two substrates; before washing the conversion panel or the liquid crystal panel, the cell-aligning packaging method further comprises: thinning the substrate of the conversion panel close to the first polarizer and/or the substrate of the liquid crystal panel close to the first polarizer through a thinning process. Further preferably, the thinning process includes an etching process or a mechanically thinning process.

Preferably, before the conversion panel and the liquid crystal panel are bonded, an OCA optical adhesive is coated on the entire surface of the conversion panel or the liquid crystal panel close to the first polarizer.

Preferably, before the conversion panel and the liquid crystal panel are bonded, UV glue is coated around the conversion panel or the liquid crystal panel; and the UV glue around the conversion panel or the liquid crystal panel is cured.

The beneficial effect of the present invention is as follows: in the stereoscopic display device of the present invention, the focal length f of the liquid crystal lens is decreased by reducing the number of layers of the polarizer located between the conversion panel and the liquid crystal panel, and thinning the substrate of the conversion panel and/or the substrate of the liquid crystal panel through a thinning process, and the conversion panel and the liquid crystal panel are bonded and packaged through the adhesive lump in the non-display area, thus allowing the display panel to have a smaller visual distance h which is applicable to portable mobile products, and realizing better application of the liquid crystal lens in 3D stereoscopic display of portable mobile products.

BRIEF DESCRIPTION OF THE DRAWINGS

FIG. 5A is a schematic diagram of forming a conversion panel.

FIG. 5B is a schematic diagram of placing the first polarizer on the conversion panel.

FIG. 5C is a schematic diagram of aligning the conversion panel and a liquid crystal panel to form a cell.

Figure 1:
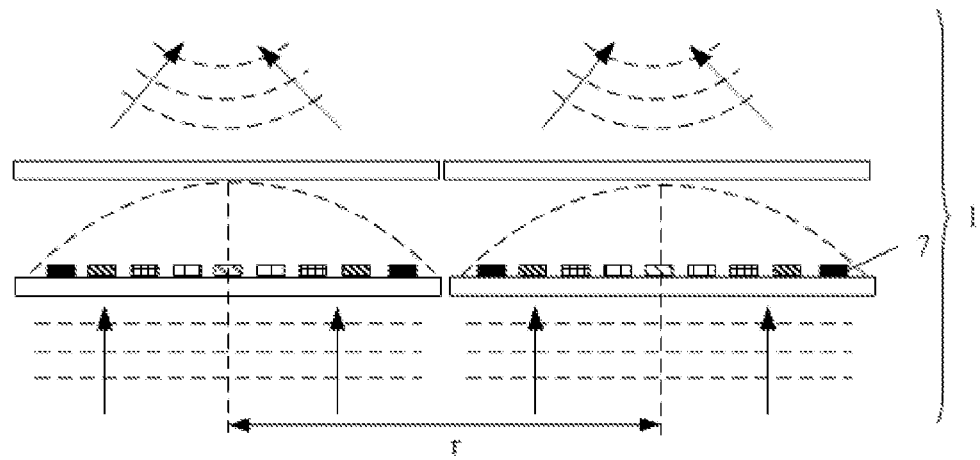
FIG. 1 is a schematic diagram illustrating principle of enabling twisted nematic liquid crystals to achieve an effect of liquid crystal lens by a gradient electric field in a conversion panel.

Reference numerals: 1—conversion panel; 11—twisted nematic liquid crystal layer; 12—substrate; 2—liquid crystal panel; 21—substrate; 22—liquid crystal layer; 3—first polarizer; 31—first polarizing layer; 32—supporting layer; 33—adhesive layer; 4—second polarizer; 5—adhesive lump; 6—sealant; 7—electrode.

DETAILED DESCRIPTION OF THE EMBODIMENTS

To enable a person skilled in the art to better understand technical solutions of the present invention, a stereoscopic display device and a cell-aligning packaging method of a stereoscopic display device provided by the present invention will be further described in detail below in conjunction with the accompanying drawings and specific implementations.

Figure 2:
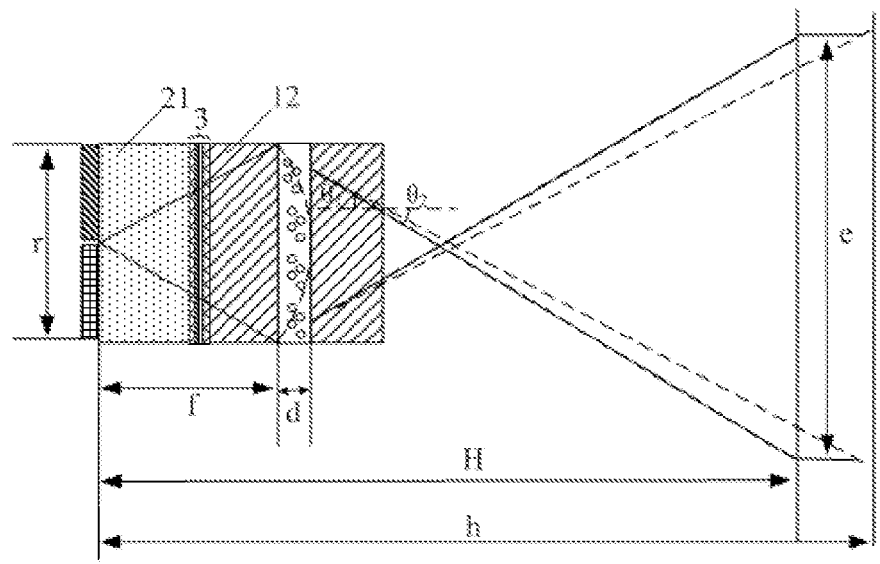
FIG. 2 is a schematic diagram illustrating a relationship between a focal length and a visual distance of a liquid crystal lens in a display device.

FIG. 2 is a schematic diagram illustrating a relationship between a focal length and a visual distance of a liquid crystal lens in a display device. As shown in FIG. 2, the technical concept of the present invention is based on the relationship between a focal length and a visual distance of a liquid crystal lens in a display device as expressed in formula (1):

$$h = f \times e / r \tag{1}$$

in formula (1), h is the visual distance; f is the focal length; e is n (n is a positive integer) times interpupillary distance; and r is lens pitch. Here, f is a sum of a thickness of one substrate 12 of a conversion panel 1 to be cell-aligned, a thickness of one substrate 21 of a liquid crystal panel 2, and a thickness of a polarizer located therebetween (or air gap therebetween may be further included).

To be applicable to portable mobile products which need a relatively small visual distance, the relatively small visual distance is obtained by reducing the focal length f in the present invention. That is, as shown in FIG. 2, the visual distance of the stereoscopic display device is decreased by reducing a direct spacing distance between the liquid crystal panel 2 and the conversion panel 1.

The present invention provides a stereoscopic display device which is divided into a display area and a non-display area surrounding the display area on the periphery of the display area, wherein, the stereoscopic display device comprises a conversion panel and a liquid crystal panel which are aligned to form a cell, a first polarizer is provided between the conversion panel and the liquid crystal panel, the first polarizer is arranged in the display area, and an adhesive lump is provided around the first polarizer and correspondingly to the non-display area between the conversion panel and the liquid crystal panel and is used for bonding the conversion panel and the liquid crystal panel into a whole.

The present invention further provides a cell-aligning packaging method of a stereoscopic display device, the stereoscopic display device is divided into a display area and a non-display area surrounding the display area on the periphery of the display area, and comprises a conversion panel and a liquid crystal panel which are aligned to form a cell, a first polarizer is provided between the conversion panel and the liquid crystal panel, and the cell-aligning packaging method comprises: arranging the first polarizer in the display area, and providing an adhesive lump around the first polarizer and correspondingly to the non-display area between the conversion panel and the liquid crystal panel, so that the conversion panel and the liquid crystal panel are bonded into a whole through the adhesive lump.

Embodiment 1

Figure 3:
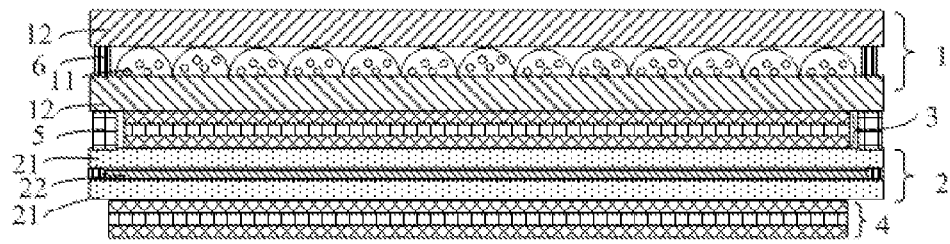
FIG. 3 is a schematic diagram of a structure of a stereoscopic display device in Embodiment 1 of the present invention.

The present embodiment provides a stereoscopic display device, which is divided into a display area and a non-display area surrounding the display area on the periphery of the display area. FIG. 3 is a schematic diagram of a structure of the stereoscopic display device in the present embodiment. As shown in FIG. 3, the stereoscopic display device comprises a conversion panel 1 and a liquid crystal panel 2 which are aligned to form a cell, a first polarizer 3 is provided at a side of the liquid crystal panel 2 close to the conversion panel 1 (the polarize located between the conversion panel 1 and the liquid crystal panel 2 is the first polarizer 3), the first polarizer 3 is arranged in an area, corresponding to the display area, between the conversion panel 1 and the liquid crystal panel 2, an adhesive lump 5 is provided in an area, corresponding to the non-display area, between the conversion panel 1 and the liquid crystal panel 2, and the adhesive lump 5 completely surrounds the first polarizer 3 such that the first polarizer 3 is within the adhesive lump 5 and is used for bonding the conversion panel 1 and the liquid crystal panel 2 into a whole.

Generally, the conversion panel 1 comprises two substrates 12 arranged oppositely and a twisted nematic liquid crystal layer 11 arranged between the two substrates 12, and the liquid crystal panel 2 comprises two substrates 21 arranged oppositely and a liquid crystal layer 22 arranged between the two substrates 21.

Figure 4:
FIG. 4 is a schematic diagram of a structure of a first polarizer in the stereoscopic display device shown in FIG. 3.

FIG. 4 is a schematic diagram of a structure of a first polarizer in the stereoscopic display device shown in FIG. 3. As shown in FIG. 4, the first polarizer 3 comprises a first polarizing layer 31 and two supporting layers 32 arranged on both side faces of the first polarizing layer 31 respectively. In the present embodiment, a height of the adhesive lump 5 is larger than or equal to a thickness of the first polarizer 3, and preferably, the height of the adhesive lump 5 is equal to the thickness of the first polarizer 3 so that a minimum spacing distance between the liquid crystal panel 2 and the conversion panel 1 is obtained. Meanwhile, it should be understood that, when the height of the adhesive lump 5 is larger than the thickness of the first polarizer 3, it is more likely to maintain the height of the adhesive lump 5 after melted and then condensed, but the height of the adhesive lump 5 should be smaller than the thickness of the polarizer between the liquid crystal panel and the conversion panel in the prior art, so that the focal length of the liquid crystal lens of the stereoscopic display device formed after the cell-aligning packaging is performed with the adhesive lump 5 can be smaller than that of the liquid crystal lens of the stereoscopic display device in the prior art.

In addition, a width of the adhesive lump 5 is smaller than or equal to that of the non-display area, namely, the adhesive lump 5 may be arranged at a certain distance from the first polarizer 3 in a horizontal space, and may preferably be in direct contact with the first polarizer 3. For the purpose of adhesion, the adhesive lump 5 is formed from powder particles containing $V_2O_5$ (vanadium pentoxide) material. The powder particles can melt after absorbing laser energy, and then cool and condense into glass frit. When the adhesive lump 5 is in direct contact with the first polarizer 3 in the horizontal space, since the adhesive lump 5 is merely in contact with a side face of the first polarizer 3, the performance of the first polarizer 3 will not be affected in the process of forming the glass frit as the adhesive lump 5.

Figure 8:
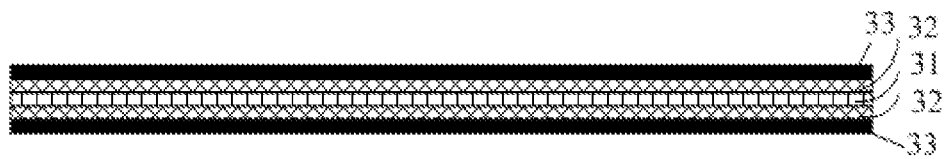
FIG. 8 is a schematic diagram of a structure of a polarizer located between the conversion panel and the liquid crystal panel in the prior art.

In order to achieve normal display of the liquid crystal panel 2 and enable the liquid crystal panel 2 to cooperate with the conversion panel 1 to achieve 3D stereoscopic display, a second polarizer 4 is also provided at a side of the liquid crystal panel 2 away from the conversion panel 1, and a polarization direction of the first polarizer 3 is perpendicular to that of the second polarizer 4. As shown in FIG. 3, the second polarizer 4 is arranged correspondingly to the first polarizer 3 in position, and the second polarizer 4 further extends to the non-display area. For example, a size of the second polarizer 4 is larger than that of the display area by 2 mm in each side, and meanwhile, the second polarizer 4 and the liquid crystal panel 2 may be bonded in the same way as that used in bonding the liquid crystal panel and the polarizer in the prior art, namely, the second polarizer 4 and the liquid crystal panel 2 may be bonded together by a whole adhesive layer 33. In the prior art, a structure of the polarizer is shown in FIG. 8, in which the whole adhesive layer 33 is provided on each of the upper and lower sides of the polarizer. In the present embodiment, the main function of the first polarizer 3 and the second polarizer 4 lies in that a light source without polarization is enabled to produce polarization, namely, light emitted from the light source without polarization is transformed into polarized light, and further, whether the light passes through or not is controlled by using the rotation characteristic of liquid crystal molecules in the liquid crystal layer 22 of the liquid crystal panel 2, so as to achieve image display. In addition, the first polarizer 3 and the second polarizer 4 also have functions of improving light transmittance, enlarging viewing angle range, preventing dazzle and the like.

The manufacturing process of a stereoscopic display device in the present embodiment comprises the following steps.

At step 1, a conversion panel 1 and a liquid crystal panel 2 are formed.

Figure 5A:
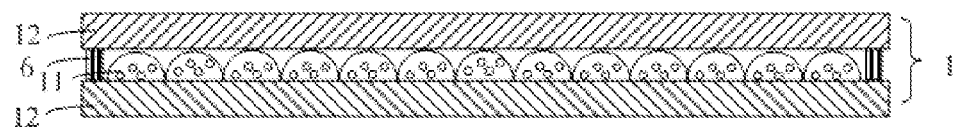
FIGS. 5A to 5C are schematic diagrams illustrating a manufacturing flow of the stereoscopic display device shown in FIG. 3.

In this step, two glass substrates 12 are aligned to form a cell, in which twisted nematic liquid crystals are then encapsulated, so as to form the conversion panel 1 whose structure is shown in FIG. 5A. A color filter substrate and an array substrate are formed, and a liquid crystal layer is encapsulated between the color filter substrate and the array substrate which are aligned to form a cell, so as to form the liquid crystal panel 2. Referring to FIG. 3, the conversion panel 1 and the liquid crystal panel 2 are sealed by sealant 6.

At step 2, the conversion panel 1 and the liquid crystal panel 2 are aligned to form a cell.

Figure 5B:
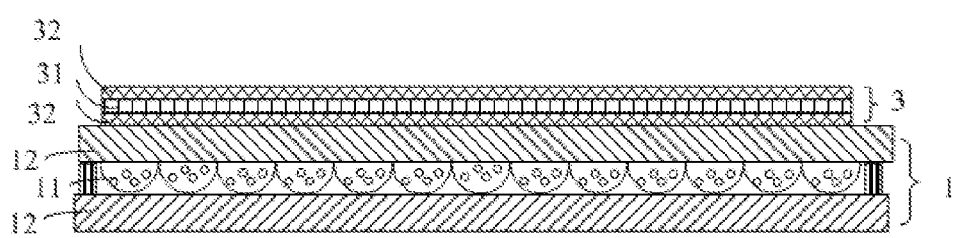
Figure 5C:
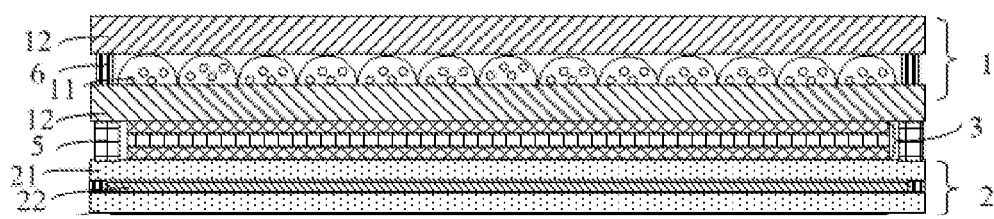

This step comprises: placing a first polarizer 3 in an area, corresponding to the display area, of one side face of the conversion panel 1; providing an adhesive lump 5 in an area, corresponding to the non-display area, of the one side face of the conversion panel 1 or of a side face of the liquid crystal panel 2, wherein the adhesive lump 5 completely surrounds the first polarizer 3; and bonding and packaging the conversion panel 1 and the liquid crystal panel 2 into a whole through the adhesive lump 5, thus the liquid crystal panel 1 and the conversion panel 2 are aligned to form a cell, as shown in FIG. 5C.

Figure 6:
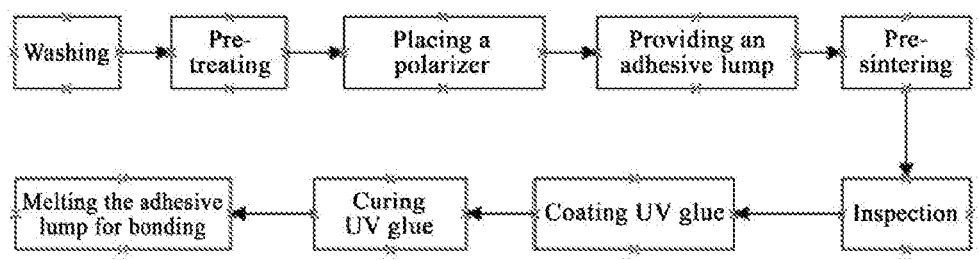
FIG. 6 is a schematic diagram illustrating a flow of a cell-aligning process of the stereoscopic display device in Embodiment 1 of the present invention.

Specifically, as shown in FIG. 6, this step comprises the following sub-steps.

Firstly, the conversion panel 1 is washed (Washing).

The conversion panel is pretreated by using UV ozone (Pre-treatment UV Zone) to achieve sufficient cleanliness.

Secondly, the first polarizer 3 is placed in the area, corresponding to the display area, of one side face of the conversion panel 1, and the conversion panel 1 with the first polarizer 3 placed thereon is shown in FIG. 5B. Undoubtedly, the first polarizer 3 may be placed in an area, corresponding to the display area, of a side face of the liquid crystal panel 2. The present embodiment is described only by taking a case that the first polarizer 3 is placed on one side face of the conversion panel 1 as an example, but the present invention is not limited thereto.

Thirdly, the adhesive lump 5 is provided in the area, corresponding to the non-display area, of the one side face of the conversion panel 1 or of a side face of the liquid crystal panel 2 (Frit Paste Dispensing), such that the adhesive lump 5 completely surrounds the first polarizer 3, wherein the adhesive lump 5 is formed from powder particles containing $V_2O_5$ (vanadium pentoxide) material, which can absorb laser energy to melt, and then be cooled and condensed into glass frit. Moreover, the height of the adhesive lump 5 is larger than or equal to the thickness of the first polarizer 3, and the width of the adhesive lump 5 is smaller than or equal to that of the non-display area.

Fourthly, the conversion panel is pre-sintered (Pre-sintering), and the pre-sintering is performed under temperature from 230° C. to 250° C.

Preferably, the conversion panel 1 is inspected (Inspection), so as to avoid defects such as disconnection of the adhesive lump 5 and the like.

In order to further clear up air or water vapor between the first polarizer 3 and the conversion panel 1, preferably, a step of coating UV glue around the conversion panel 1 (Dummy Seal dispensing) is added, and subsequently, the UV glue around the conversion panel 1 is cured correspondingly (UV curing).

Fifthly, the adhesive lump 5 is melted by laser (Laser Frit Sealing), and the conversion panel 1 with the first polarizer 3 placed thereon and the liquid crystal panel 2 are bonded through the adhesive lump 5, wherein, the adhesive lump 5 surrounds the first polarizer 3 so as to form an integral shown in FIG. 5C.

Compared to the polarizer at a corresponding position in the prior art, an adhesive layer 33 for bonding the first polarizer 3 between one substrate of the liquid crystal panel 2 and one substrate of the conversion panel 1 is omitted in the polarizer 3 in the present embodiment, and consequently, the number of layers is decreased, and an overall thickness is correspondingly reduced. The function of the adhesive layer 33 in the prior art is implemented by the adhesive lump 5 in the present embodiment. Moreover, the adhesive lump 5 also has the additional functions as follows: the adhesive lump 5 is capable of sealing the first polarizer 3 between the conversion panel 1 and the liquid crystal panel 2 so that the first polarizer 3 is isolated from the outside air, and the first polarizer 3 is tightly attached to the one substrate of the conversion panel 1 and the one substrate of the liquid crystal panel 2 which are in contact with the first polarizer 3. Further, by making the pressure in sealed space formed by the conversion panel 1, the liquid crystal panel 2 and the adhesive lump 5 smaller than atmospheric pressure (e.g., one standard atmospheric pressure), sealing quality is ensured by virtue of pressure of external atmosphere, and better sealing effect can be achieved especially when the adhesive lump 5 and the first polarizer 3 are in direct contact.

At step 3, a display panel is formed.

In this step, a second polarizer 4 is attached to a side face of the liquid crystal panel 2 away from the conversion panel 1, and a drive circuit is connected, thus finishing manufacturing the display panel available for stereoscopic display.

In the stereoscopic display device in the present embodiment, the liquid crystal panel 2 is between the first polarizer 3 and the second polarizer 4, each of the color filter substrate and the array substrate in the liquid crystal panel 2 is formed on one glass plate, and when the color filter substrate and the array substrate are cell-aligned to form the liquid crystal panel 2, the glass plates are at the outer sides. When the liquid crystal panel 2 and the conversion panel 1 are cell-aligned to form the stereoscopic display panel, a sum of the thickness of the glass plate of one substrate, used for cell-aligning, of the liquid crystal panel 2, the thickness of the glass plate of one substrate, used for cell-aligning, of the conversion panel 1, and the height of the adhesive lump 5 is the focal length of the liquid crystal lens formed by the twisted nematic liquid crystals in the conversion panel.

Here, it should be understood that, the one substrate, which is used for cell-aligning and whose thickness constitutes a part of the local length of the liquid crystal lens, of the liquid crystal panel 2 may be the glass plate in the color filter substrate, and in this case, the first polarizer is the polarizer provided at an outer side of the glass plate of the color filter substrate. Alternatively, the one substrate, which is used for cell-aligning and whose thickness constitutes a part of the local length of the liquid crystal lens, of the liquid crystal panel 2 may be the glass plate in the array substrate, and in this case, the first polarizer is the polarizer provided at an outer side of the glass plate of the array substrate. That is, the conversion panel 1 may be arranged at the color filter substrate side of the liquid crystal panel 2, or at the array substrate side of the liquid crystal panel 2, which are not limited here.

Referring to FIG. 1, the conversion panel 1 in the present embodiment adopts electro-liquid crystal lens (LC lens) type twisted nematic liquid crystal stereoscopic display, and images are spatially separated by means of lens effect of the liquid crystal lens, thus achieving 3D display. Based on the above description of the structure and manufacturing process of the stereoscopic display device, as well as formula (1), the present embodiment can obtain a smaller visual distance, and is more suitable for portable mobile products to achieve 3D stereoscopic display as compared to the prior art.

For example, in a stereoscopic display device product of the prior art, both the substrate in the conversion panel and the substrate in the liquid crystal panel adopt glass plates with the same thickness, and relevant parameters are as follows: the thickness of the glass plates is 0.3 mm, the thickness of the polarizer is 180 µm (wherein, the thickness of the first polarizing layer is 20 µm, the thicknesses of two supporting layers are 40 µm respectively, and the thicknesses of two adhesive layers are 40 µm respectively), thus the focal length f of the liquid crystal lens is 780 µm, lens pitch r is 600 µm, n times interpupillary distance e is 65 mm, and after substituting these values into formula (1), the minimum visual distance h of the product is calculated to be 84.5 mm. However, in the present embodiment, the lens pitch r and n times interpupillary distance e are kept unchanged, the thickness of the first polarizer 3 becomes 100 µm (wherein, the thickness of the first polarizing layer is 20 µm, and the thicknesses of two supporting layers are 40 µm respectively), and after substituting these values into formula (1), the minimum visual distance h of the product is calculated to be 73.6 mm, which is less than the minimum visual distance of the prior art by 13%. In the present embodiment, since there is no need to provide the adhesive layer on the outer side of the supporting layer 32, and meanwhile, factors such as reliability, tolerance and the like are considered, a thinner supporting layer 32 (e.g., 20 µm in thickness) may be adopted in the present embodiment, and in this case, the minimum visual distance h becomes 69 mm, which is less than the minimum visual distance of the prior art by 18.5%.

In the present embodiment, the electro-liquid crystal lens is used to spatially separate images in display, and by reducing the focal length f of the liquid crystal lens, 3D display having a relatively small visual distance and applicable to portable mobile products is achieved.

Embodiment 2

The present embodiment provides a stereoscopic display device, in which, unlike Embodiment 1, the adhesive lump 5 in the present embodiment adopts a sealant, and the liquid crystal panel 2 and the conversion panel 1 are bonded and packaged through the sealant.

In the manufacturing process of the stereoscopic display device of the present embodiment, specific steps of aligning the liquid crystal panel 2 and the conversion panel 1 to form a cell comprise: washing the conversion panel 1 or the liquid crystal panel 2; pretreating the conversion panel 1 or the liquid crystal panel 2 by using UV particles; placing the first polarizer 3 in an area, corresponding to the display area, of one side face of one of the conversion panel 1 and the liquid crystal panel 2; coating the sealant in an area, corresponding to the non-display area, of the same side face as the one on which the first polarizer 3 is placed or of a side face of the other of the conversion panel 1 and the liquid crystal panel 2; and bonding the conversion panel 1 and the liquid crystal panel 2, wherein, the sealant surrounds the first polarizer 3 after the conversion panel 1 and the liquid crystal panel 2 are bonded.

Undoubtedly, in order to clear up air or water vapor between the first polarizer 3 and the conversion panel 1 or the liquid crystal panel 2, preferably, steps of coating UV glue around the conversion panel 1 or the liquid crystal panel 2 (Dummy Seal dispensing), and curing the UV glue around the conversion panel 1 or the liquid crystal panel 2 (UV curing) may be added, which are not described repeatedly here.

In the present embodiment, the structure of the first polarizer 3 located between the conversion panel 1 and the liquid crystal panel 2 is the same as that of the first polarizer 3 in Embodiment 1, and is not described repeatedly here.

Compared to Embodiment 1, the stereoscopic display device of the present embodiment adopts the sealant as the adhesive lump, and thus has advantages that the material is easily obtained, process technology is mature, etc.

Embodiment 3

The present embodiment provides a stereoscopic display device, in which, unlike Embodiment 1 or 2, OCA (Optically Clear Adhesive) optical adhesive is further provided between the conversion panel 1 and the first polarizer 3, and/or, between the liquid crystal panel 2 and the first polarizer 3. The OCA optical adhesive can further enhance the bonding effect between the first polarizer and the conversion panel and/or the liquid crystal panel.

Correspondingly, in the manufacturing process of the stereoscopic display device, in order to achieve better bonding effect between the first polarizer 1 and the conversion panel 1 and/or the liquid crystal panel 2, preferably, a step of coating the OCA optical adhesive on the entire surface(s) of the conversion panel 1 and/or the liquid crystal panel 2 close to the first polarizer 3 (Lamination) is further added.

Here, a thickness of the OCA optical adhesive is on the order of 10 µm. The OCA optical adhesive, due to its excellent cohesiveness, can achieve better bonding effect between the first polarizer and the liquid crystal panel and/or the conversion panel, and further make the bonded display panel present better integrality.

Embodiment 4

Figure 7:
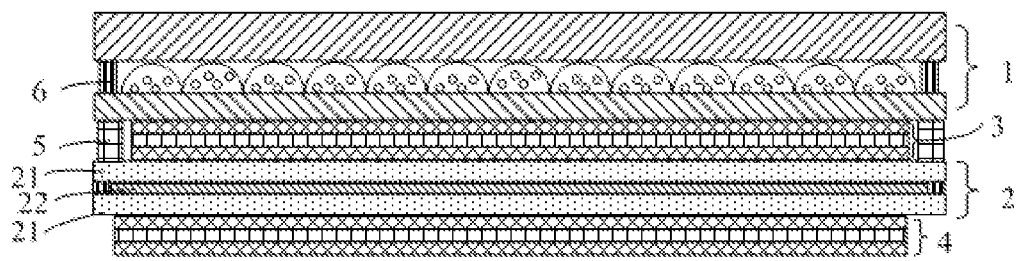
FIG. 7 is a schematic diagram of a structure of a stereoscopic display device in Embodiment 4 of the present invention.

The present embodiment provides a stereoscopic display device, in which, unlike any one of Embodiments 1 to 3, as shown in FIG. 7, the thickness of the substrate 12 of the conversion panel 1 close to the first polarizer 3 is smaller than that of the substrate 12 of the conversion panel 1 away from the first polarizer 3, and/or, the thickness of the substrate 21 of the liquid crystal panel 2 close to the first polarizer 3 is smaller than that of the substrate 21 of the liquid crystal panel 2 away from the first polarizer 3.

In the present embodiment, in order to further decrease the focal length of the liquid crystal lens, substrates with a smaller thickness may be adopted, for example, in the manufacturing process of the conversion panel 1 or the liquid crystal panel 2, substrates with a smaller thickness may be directly used, or the thickness of the substrate of the conversion panel 1 or the liquid crystal panel 2 clinging to the first polarizer 3 may be thinned through a thinning process.

Here, the thickness of the substrate of the conversion panel 1 clinging to the first polarizer 3 may be thinned by using an etching process or a mechanically thinning process, and/or, the thickness of the substrate of the liquid crystal panel 2 clinging to the first polarizer 3 may be thinned by using an etching process or a mechanically thinning process.

Compared to any one of Embodiments 1 to 3, in the manufacturing process of the stereoscopic display device of the present embodiment, before placing the first polarizer 3, the substrate at one side of the conversion panel 1 is first thinned through an etching process or a mechanically thinning process, then the first polarizer 3 is placed on the thinned substrate, and subsequently, a surface of the conversion panel 1 with the first polarizer 3 placed thereon is bonded with a surface of the liquid crystal panel 2 (e.g., a surface of the color filter substrate), thus bonding the conversion panel 1 and the liquid crystal panel 2 into a whole.

Compared to the prior art, in the stereoscopic display device of the present embodiment, the number of layers for the first polarizer 3 is reduced, the adhesive layer 33 for adhering to the liquid crystal panel 2 and the conversion panel 1 is omitted, and correspondingly, the thickness is decreased. In addition, compared to any one of Embodiments 1 to 3, the thickness of the substrate of the conversion panel 1 close to the first polarizer 3, and/or the thickness of the substrate of the liquid crystal panel 2 close to the first polarizer 3 is thinned through a thinning process, which further decreases the direct spacing distance between the liquid crystal panel 2 and the conversion panel 1, decreases the focal length f of the liquid crystal lens, and accordingly decreases the visual distance h of the display panel.

The stereoscopic display device in the present embodiment, combined with the thinning process, can achieve a smaller visual distance h, that is, can reduce the visual distance h more significantly.

In the stereoscopic display devices of Embodiments 1 to 4, the focal length f of the liquid crystal lens is decreased by reducing the number of layers of the polarizer located between the conversion panel and the liquid crystal panel, and thinning the substrate of the conversion panel and/or the substrate of the liquid crystal panel through a thinning process, and the conversion panel and the liquid crystal panel are bonded and packaged through the adhesive lump in the non-display area, thus enabling the display panel to have a smaller visual distance h which is more suitable for portable mobile products, and realizing application of the liquid crystal lens in 3D stereoscopic display of portable mobile products.

It can be understood that, the above implementations are merely exemplary implementations used for explaining the principle of the present invention, but the present invention is not limited thereto. For those skilled in the art, various modifications and improvements may be made without departing from the spirit and essence of the present invention, and these modifications and improvements are also deemed as falling within the protection scope of the present invention.

The invention claimed is:

1. A cell-aligning packaging method of a stereoscopic display device, wherein, the stereoscopic display device is divided into a display area and a non-display area surrounding the display area on the periphery of the display area, and comprises a conversion panel and a liquid crystal panel which are aligned to form a cell, a first polarizer is provided between the conversion panel and the liquid crystal panel, and the cell-aligning packaging method comprises:

arranging the first polarizer in the display area, and providing an adhesive lump around the first polarizer and correspondingly to the non-display area between the conversion panel and the liquid crystal panel, so that the conversion panel and the liquid crystal panel are bonded into a whole through the adhesive lump; and wherein the cell-aligning packaging method specifically comprises the steps of:

washing the conversion panel or the liquid crystal panel;

pretreating the conversion panel or the liquid crystal panel by using UV particles;

placing the first polarizer in an area, corresponding to the display area, of one side face of one of the conversion panel and the liquid crystal panel;

providing the adhesive lump in an area, corresponding to the non-display area, of the same side face as the one on which the first polarizer is placed or of a side face of the other of the conversion panel and the liquid crystal panel, wherein the adhesive lump is formed from powder particles containing V205 material;

pre-sintering the conversion panel or the liquid crystal panel; and melting the adhesive lump by using laser, and bonding the conversion panel and the liquid crystal panel through the adhesive lump, wherein, the adhesive lump surrounds the first polarizer after the conversion panel and the liquid crystal panel are bonded.

2. The cell-aligning packaging method according to claim 1, wherein, the first polarizer comprises a first polarizing layer and two supporting layers arranged on both side faces of the first polarizing layer respectively, a height of the adhesive lump is larger than or equal to a thickness of the first polarizer, and a width of the adhesive lump is smaller than or equal to that of the non-display area.

3. The cell-aligning packaging method according to claim 1, wherein, the conversion panel comprises two substrates arranged oppositely and a twisted nematic liquid crystal layer arranged between the two substrates, the liquid crystal panel comprises two substrates arranged oppositely and a liquid crystal layer arranged between the two substrates; and before washing the conversion panel or the liquid crystal panel, the cell-aligning packaging method further comprises: thinning the substrate of the conversion panel close to the first polarizer, and/or, thinning the substrate of the liquid crystal panel close to the first polarizer through a thinning process.

4. The cell-aligning packaging method according to claim 3, wherein, the thinning process includes an etching process or a mechanically thinning process.

5. The cell-aligning packaging method according to claim 1, wherein, before bonding the conversion panel and the liquid crystal panel, the cell-aligning packaging method further comprises: coating an OCA optical adhesive on the entire surface of the conversion panel or the liquid crystal panel close to the first polarizer.

6. The cell-aligning packaging method according to claim 1, wherein, before bonding the conversion panel and the liquid crystal panel, the cell-aligning packaging method further comprises:
   coating UV glue around the conversion panel or the liquid crystal panel; and
   curing the UV glue around the conversion panel or the liquid crystal panel.

7. A cell-aligning packaging method of a stereoscopic display device, wherein, the stereoscopic display device is divided into a display area and a non-display area surrounding the display area on the periphery of the display area, and comprises a conversion panel and a liquid crystal panel which are aligned to form a cell, a first polarizer is provided between the conversion panel and the liquid crystal panel, and the cell-aligning packaging method comprises:
   arranging the first polarizer in the display area, and providing an adhesive lump around the first polarizer and correspondingly to the non-display area between the conversion panel and the liquid crystal panel, so that the conversion panel and the liquid crystal panel are bonded into a whole through the adhesive lump; and
   wherein the cell-aligning packaging method specifically comprises the following steps of:
   washing the conversion panel or the liquid crystal panel;
   pretreating the conversion panel or the liquid crystal panel by using UV particles;
   placing the first polarizer in an area, corresponding to the display area, of one side face of one of the conversion panel and the liquid crystal panel;
   coating sealant in an area, corresponding to the non-display area, of the same side face as the one on which the first polarizer is placed or of a side face of the other of the conversion panel and the liquid crystal panel, and bonding the conversion panel and the liquid crystal panel through the sealant,
   wherein, the sealant surrounds the first polarizer after the conversion panel and the liquid crystal panel are bonded.

8. The cell-aligning packaging method according to claim 7, wherein, the conversion panel comprises two substrates arranged oppositely and a twisted nematic liquid crystal layer arranged between the two substrates, the liquid crystal panel comprises two substrates arranged oppositely and a liquid crystal layer arranged between the two substrates; and before washing the conversion panel or the liquid crystal panel, the cell-aligning packaging method further comprises: thinning the substrate of the conversion panel close to the first polarizer, and/or, thinning the substrate of the liquid crystal panel close to the first polarizer through a thinning process.

9. The cell-aligning packaging method according to claim 8, wherein, the thinning process includes an etching process or a mechanically thinning process.

10. The cell-aligning packaging method according to claim 7, wherein, before bonding the conversion panel and the liquid crystal panel, the cell-aligning packaging method further comprises: coating an OCA optical adhesive on the entire surface of the conversion panel or the liquid crystal panel close to the first polarizer.

11. The cell-aligning packaging method according to claim 7, wherein, before bonding the conversion panel and the liquid crystal panel, the cell-aligning packaging method further comprises:
   coating UV glue around the conversion panel or the liquid crystal panel; and
   curing the UV glue around the conversion panel or the liquid crystal panel.

* * * * *